Jan. 12, 1943. R. P. LAPPALA 2,308,087
TEMPERATURE INDICATOR
Filed March 6, 1940
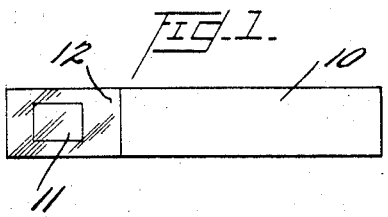
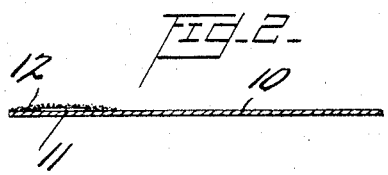
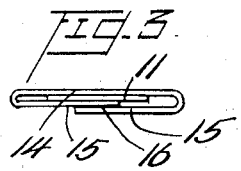
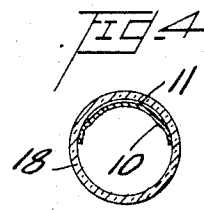
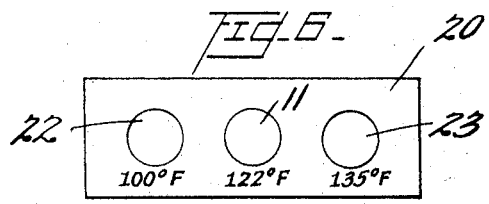
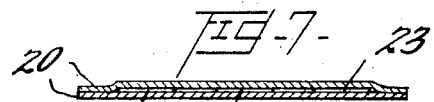
Inventor
Risto P. Lappala,
By Henry H. Snelling
Attorney Patented Jan. 12, 1943

2,308,087

UNITED STATES PATENT OFFICE 2,308,087

TEMPERATURE INDICATOR

Risto P. Lappala, Little Falls, N. Y., assignor to Chr. Hansen's Laboratory, Inc., Little Falls, N. Y., a corporation of New York Application March 6, 1940, Serial No. 322,633

7 Claims. (Cl. 73—356)

This invention relates to means for indicating temperature and has for its principal object the provision of such a device for indicating the correct temperature of milk at which to add rennet in the making of a milk product such as rennet-custards, cheese, milk drinks, etc.

A further object of the present invention is to provide an extremely simple and inexpensive temperature indicator for facilitating the preparation of a product and avoiding any possible contamination of the product by the indicator.

A still further object of the present invention is to provide a temperature indicator which may be packed with a food product, to be used to bring milk to a correct temperature without the use of a thermometer, the indicator including a changeable color medium which is prevented from contaminating the milk by a transparent covering of any kind such as Cellophane, Pliofilm, glass, or any varnish such as a lacquer.

In the making of cheddar cheese the rennet usually is added to the milk at a temperature approximately 86° F. and the mixture is usually cooked up to 108° F. While cheese makers would normally use a thermometer the present invention would permit using the indicator here claimed to indicate these two temperatures utilizing one dye, paint or other coloring medium which alters its color at the lower temperature and again alters its color at the higher temperature, or in a still simpler form the coloring medium would be of two types, one of which would change color at 86° F. and the other would change color at 108° F. Likewise in the making of rennet desserts the rennet should not be added below 100° F., preferably should be added at 122° F., but to insure the formation of a firm curd the milk should not be elevated above 135° F. The present invention contemplates placing on a single strip of material three separate blocks or marks of coloring material which respectively change color at these figures.

In a modified form of the invention a paint such as will change from say green to brown, for example, at any chosen temperature, which may be selected at 122° F. is placed upon a carrying strip, matching as nearly as possible the low temperature color of the reversible paint so that when the temperature is increased above approximately 120° F. the mark, which is preferably a collection of letters, by changing its color will show up strikingly on the background which does not change color.

In a still further modification the paint which does not change color may be applied to the carrying strip and the heat sensitive paint applied to the inside of the transparent protective coating.

In its preferred form the invention contemplates the use of a patch of color on a clear background which may be white or transparent and the paint or other reversible dye is protected by a covering of waterproof transparent material of any type which will serve to insure against contamination of the milk by the color medium. An extremely simple form would include the use of glazed paper on which was printed one or more symbols in irreversible or reversible color paint and the lacquer or other transparent varnish or film could be applied just sufficiently in area to insure covering the color medium, or it could cover a portion or all of the paper strip as well.

Another quite simple form is made by printing in a color changing medium on a strip of transparent or translucent paper-like material such as glazed paper, Cellophane, Pliofilm, etc. and then folding the two side edges to inclose completely the coloring matter and this is then sealed either by heating or the use of a suitable solvent, thus forming a flattened tube. The tube in turn is separated by well known machinery into short strips, sealed at both ends, as is familiar in medicinal pill or tablet packages.

By means of the present invention the housewife can very conveniently make desserts such as rennet-custards of precisely the correct firmness by adding the rennet at just the right temperature as indicated by the change of color in the indicator. At the present time the housewife rarely ever is willing to use a thermometer and either guesses at the temperature of the milk by tasting or approximates it by testing a drop of the milk on her wrist.

In the drawing:

Figure 1 is a plan view of a simple form of the invention.

Figure 2 is a section therethru.

Figure 3 is a modified form showing a flattened tube made of transparent material.

Figure 4 shows an indicator, the outside of which is formed by a seamless tube.

Figure 5 is a plan view of a modified form.

Figure 6 is a further modification showing a plurality of indicators for noting different temperatures.

Figure 7 is a section through the indicator of Figure 6.

In the drawing, Figures 1 and 2 show a very simple form of the invention but one which has been found to be extremely satisfactory, indicating quickly and clearly the proper temperature. In this preferred form 10 represents a strip of glazed paper which is substantially waterproof at least for a short period of time. Near one end of this strip is a mark 11 which can be of any desired configuration, a mere square as shown, or a letter or numeral, the specific outline being immaterial. This block or symbol is of a material readily purchasable in the market and is such as to change color at some chosen temperature, for example, 122° F. In the indicator which I like best the color is a bright green up to approximately 120° but after reaching 122° an increase in temperature changes the bright green to a reasonably dark brown, making a very striking change of color.

The paint manufacturers specializing in this field can furnish a medium which alters color at practically any ordinarily desired temperature and frequently offer a choice of colors at the usual ranges. Inasmuch as many of these paints or dyes or other reversible or irreversible color mediums may contain mercury or copper or other poisonous substances I prefer to insure against contamination of the food by covering the color changing medium with a transparent film 12 of some kind which is substantially insoluble in milk or water and which conducts heat sufficiently rapidly to permit the housewife dipping the indicator into the milk and if the milk or other food is at the proper temperature the change in color will occur almost instantly.

In Figure 3 the color medium 11 is applied at intervals to a long strip 14 of transparent material such as Cellophane, Pliofilm, or other substantially waterproof material. In case the color medium is in letters it will be applied in reversed manner upon the strip 14 so that when the ends of the strip 15 are turned backward over the color medium and sealed as at 16 by heat or by the use of a solvent or by any other well known means the lettering will appear in the usual form through the center of the strip which is now the face of the indicator. The strip thus forms a tube with a sealed longitudinal seam and when the two ends of the flattened tube are sealed the indicator is ready for use. It is only necessary that the lower end of the indicator be sealed but I much prefer that both ends be sealed so no damage may occur if the indicator should be dropped into the milk. Machines for making such tubes and for separating them into small envelopes, sealed either by heat or otherwise at the end, with the ends turned in or merely sealed, are well known.

In Figure 4 the strip 10 is marked with the color medium 11 and is then completely inclosed by a tube 18.

In the modification shown in Figure 5 the carrier base 19 is colored to agree as nearly as possible with the color medium 11 when cold and here shown as letters spelling the word "lukewarm." These letters can scarcely be distinguished at a temperature below 122° F. but when the indicator has been exposed to a temperature above this figure the word "lukewarm" appears contrastingly against the background, which may be green, for example, the letters at a temperature above 122° F. being brown in this typical example.

In Figures 6 and 7 I show a carrier material 20 which may be of any of the various types, but is here shown as two independent strips of transparent material between which the blocks or marks are placed, loosely or applied to either strip or to both. The two transparent strips need not be of the same material but preferably are, in order to prevent curling of the indicator. The two strips are sealed together in any desired manner as for example by heat sealing if the color medium is reversible or by the use of a solvent adhesive if it is preferred to use an irreversible color to make a permanent record.

The marks are here represented as circles of color and are of different ingredients so that the first mark 22 will change color at 100° F., the middle color will change color at 122° F. and the right-hand color will change at 135° F., these three temperatures representing respectively, the lowest advisable temperature at which the rennet should be added to the milk when making rennet custards, the preferred temperature for such addition, and the temperature beyond which the milk should not be taken for best results. The word "transparent" as used in the claims denotes capable of transmitting light without major diffusion, signifying that a word or other symbol may readily be recognized through the medium referred to as being "transparent."

What I claim is:

1. A flexible strip of transparent sheet material substantially insoluble in water carrying a mark of a medium changing color at a desired temperature, said strip being sealed upon itself longitudinally and at least one of its ends to form a liquid-tight covering completely inclosing said mark.

2. The device of claim 1 in which the mark is a series of reversely printed letters spelling a word when viewed through the center of the strip with the seam behind the mark.

3. An indicator for dipping into milk to determine when such liquid is lukewarm comprising a liquid repellant paper carrier of green color having printed thereon in ink of a type which changes from green to brown at about 122° F., a series of letters, and a transparent film forming a sealed inclosure for such letters to prevent contact between the ink and the milk.

4. An indicator for dipping into milk which is being heated to determine when the milk has reached a chosen temperature, comprising a medium permanently changing color when exposed to approximately such temperature, and two layers of thin transparent liquid repellant paper completely inclosing the medium and sealed to prevent contact between the food and the medium, thus permitting the use of a medium that would contaminate the milk if in contact therewith.

5. A flexible indicator for dipping into milk which is being heated to determine when the milk has reached a chosen temperature comprising a medium temporarily changing color when exposed to approximately such temperature, and two layers of clear transparent liquid-repellant paper-like material completely inclosing the medium and sealed at its edges and at one end to prevent contact between food and the medium, thus permitting the use of a medium that would contaminate the milk if in contact therewith.

6. A flat strip indicator of an extremely simple and inexpensive type which may be given away with a package of food product and to be held with one end of the indicator between the thumb and forefinger when the indicator is dipped into a liquid food being heated in order to determine when the food has reached the required temperature, comprising a carrier of substantially waterproof material, having a mark thereon of a medium changing color at the required temperature, and flexible substantially waterproof material covering the medium to prevent contact between the food and the medium when the indicator is dipped into the liquid food, at least one of said materials being transparent in proximity to the medium so the medium may be viewed to ascertain whether or not it is changing color or has changed color.

7. The device of claim 6 in which the food is milk, the medium reversibly changes color at the required temperature, and the carrier is an elongated strip of paper, whereby the indicator is free of fragile parts.

RISTO P. LAPPALA.